United States Patent
Kirschbaum

[19]

[11] Patent Number: 6,117,383
[45] Date of Patent: Sep. 12, 2000

[54] PROCESS FOR PRODUCING STRINGS FOR STRINGING RACKETS

[75] Inventor: Horst Kirschbaum, Witten, Germany

[73] Assignee: Kirschbaum Sportartikel GmbH, Germany

[21] Appl. No.: 09/122,030

[22] Filed: Jul. 24, 1998

[51] Int. Cl.[7] .................................................. B29C 59/04
[52] U.S. Cl. ................... 264/284; 264/210.2; 264/210.8; 264/293; 428/364; 425/329; 425/385
[58] Field of Search ........................... 264/177.17, 210.2, 264/210.8, 284, 293; 428/364; 425/329, 365, 367, 385

[56] References Cited

U.S. PATENT DOCUMENTS

| | | | |
|---|---|---|---|
| 1,958,144 | 5/1934 | Hutchinson | 425/329 |
| 2,434,533 | 1/1948 | Wurzburger | 428/371 |
| 3,083,407 | 4/1963 | Leib et al. | 419/69 |
| 3,242,828 | 3/1966 | Larkin . | |
| 3,825,393 | 7/1974 | Bittner et al. | 425/392 |
| 4,349,198 | 9/1982 | Stelck | 273/73 R |
| 4,363,613 | 12/1982 | Stelck | 425/237 |
| 4,528,148 | 7/1985 | Dotti | 264/1.5 |
| 4,547,253 | 10/1985 | Heaney et al. | 156/553 |
| 4,805,393 | 2/1989 | Reta | 57/248 |
| 5,135,699 | 8/1992 | Aimono | 264/280 |
| 5,145,172 | 9/1992 | Takashima | 273/73 R |

FOREIGN PATENT DOCUMENTS

| | | |
|---|---|---|
| 0 374 357 | 7/1989 | European Pat. Off. . |
| 1.254.443 | 1/1961 | France . |
| 1.601.144 | 9/1970 | France . |
| 2.185.463 | 5/1973 | France . |
| 2.508.374 | 12/1982 | France . |
| 1.194.124 | 4/1959 | Germany . |
| 18 31 958 | 5/1961 | Germany . |
| 27 37 751 | 3/1979 | Germany . |
| 849916 | 10/1960 | United Kingdom . |

*Primary Examiner*—Jan H. Silbaugh
*Assistant Examiner*—Michael I. Poe
*Attorney, Agent, or Firm*—Snell & Wilmer L.L.P.

[57] ABSTRACT

A process for producing strings for stringing rackets is provided. In accordance with various aspects of the invention, the surface of a string made of plastic is permanently deformed under pressure at normal temperature, it being the case that the surface profile is formed by depressions being impressed in the surface of the string.

8 Claims, 3 Drawing Sheets

PROCESS FOR PRODUCING STRINGS FOR STRINGING RACKETS

FIELD OF THE INVENTION

The invention relates to a process for producing strings for stringing rackets, in which the surface of a string made of plastic is processed so as to form a surface profile, and also relates to an apparatus used for this purpose.

DESCRIPTION OF THE PRIOR ART

Corresponding strings are used for stringing tennis rackets, but also for stringing badminton rackets or squash rackets. The strings have to satisfy numerous criteria; for example they have to be sufficiently elastic, and good ball acceleration, ease of play, weather resistance and service life are important as well. Also important for the playing quality is the ability of the string, when the ball is hit, to give said ball spin (top spin or slice), which can have a considerable effect on the flying characteristics of the ball.

In addition to gut strings, strings made of plastic are often used, in particular strings made of polyamide or polyethylene terephthalate. The plastic strings are provided either as monofilment strings or as twisted strings. Strings made of plastic monofilaments are inexpensive and are not very sensitive to temperature and moisture, but can only give the ball a small amount of spin.

Twisted strings either have a number of monofilaments or as described, for example, in German Utility Model 1831 958 consist of a monofilament which has a non-round cross section, produced by using a correspondingly profiled nozzle. In order to process the strings, the latter are twisted and coiled in order to give a helical surface structure. In this case, both production and processing involve high outlay.

Strings according to U.S. Pat. No. 4,805,393 likewise have a helical structure. According to the known prior art, such structures are formed by extrusion. This process involves extremely high outlay. However, the preference for strings with corresponding surface profile results from the fact that, inter alia, they give the ball good spin.

U.S. Pat. No. 555,524 describes a process for producing a profiled string for stringing rackets, in which the core of the string is drawn through a synthetic-resin bath and the synthetic-resin-coated string is then drawn through a die, which profiles the synthetic-resin layer. The profiled outer layer made of synthetic resin is intended to give the ball an increased amount of spin. Just like other known processes (e.g. winding filaments around a core), this process involves high technical outlay and is thus expensive.

U.S. Pat. Nos. 4,349,198 and 4,363,613 describe a process for providing a string with a surface profile made of punctiform elevations. This surface structure is achieved by the string being heated and being guided in a groove between two rollers, the groove having corresponding punctiform depressions. The rollers rotate synchronously as the string is transported further, and thus process that portion of the string which is running in the grooves in each case. In this case, the heated plastic material flows into the depressions and thus forms a surface profile made of elevations which correspond to the depressions and become rigid after cooling. The process requires a complex apparatus which ensures heating and cooling as well as the guidance and transportation of the string through the apparatus.

Particularly the operation of heating commercially available stretched plastic strings is problematic. This is because the string largely loses its expansion and strength properties as a result of heating. Processing of the string thus has to take place under constant stressing, in order to avoid shrinkage and compression. The necessary apparatus involves correspondingly high outlay.

In addition, the resulting surface structure made of punctiform elevations is disadvantageous when the string is put to use (when a racket is strung) since the elevations block as the string is threaded through the bores on the frame and slides over edges and transverse strings of the racket which is to be strung. If such a string is drawn over an edge, this results in a type of sawing effect, which can cause damage and wear to the racket and to the transverse strings.

The object of the invention is thus to provide a string-producing process and apparatus which permit the inexpensive production of a string which gives good spin to the ball which is to be played.

SUMMARY OF THE INVENTION

This object is achieved according to the invention by a process in which the string is permanently deformed under pressure at normal temperature, it being the case that the surface profile is formed by depressions being impressed in the surface of the string.

This process produces a string which has a profiled surface. The profile of the surface comprises the impressed depressions and the regions remaining between these depressions. The term profile here is intended to mean that, rather than being smooth, the surface has elevated regions and depressions.

The operation of depressions being impressed under pressure differs from the surface-forming operation according to U.S. Pat. No. 4,363,613 in that it does not include the task of forming a free-flowing material. Rather, the material is compressed at the points at which depressions are impressed, this resulting in plastic deformation. In addition, depending on the strength of the material, it may also be the case here that the non-compressed regions are raised slightly.

A string which has been processed in such a way gives the ball good spin, as a result of the profiled surface. The use of monofilament strings which can be obtained very cost-effectively means that said string can be produced at low costs. Nevertheless, it has extremely favorable playing properties, with the result that the ball can be given spin which is just as good as, or even better than, the spin which is achieved by a string which has been twisted or provided with a profile by coating. It has transpired that the inner structure of the string, comprising core and sheath, is not of any major importance for the purpose of producing good spin. It is presumably sufficient for the ball not to strike a round, smooth surface, but rather for the surface of the string to have a profile, that is to say raised portions, referred to hereinbelow as webs or elevations, and depressions.

However, the operation of depressions being impressed gives rise to yet another surprising advantage:

Up until now, for the selection of strings, basically two conflicting requirements have had to be taken into account: the use of the thinnest possible strings results in increased elasticity of the stringing, which permits greater ease of playing. However, very thin strings have the disadvantage of low durability, in particular as a result of wear. However, in contrast, the use of thicker strings, which are more resistant to wear and thus have a longer service life, is disadvantageous as far as the ease of playing is concerned since these strings only have low elasticity.

Strings which are produced by the process according to the invention, then, provide for the ease of play exhibited by a thin string—and it is particularly pronounced with deeply impressed depressions having a profile depth of 10% or more of the external diameter—while they have the durability of a thick string. This can presumably be explained, in part, by a hardening effect which is produced when the plastic material is compressed under pressure. A further reason can be explained as follows:

Strings which are produced by the process according to the invention have depressions which decrease the effective diameter of the string at the locations at which they are arranged. These locations thus act as narrowings of the string which are distributed over the length of the latter and considerably increase the elasticity of the string when subjected to tensile stressing.

The depressions are located between raised regions in each case. In particular if the depressions are narrow in relation to the raised regions, the outer surface, where wear on the string can be expected, is determined essentially by the raised regions. The effective string diameter as far as mechanical wear is concerned is thus formed by the raised regions.

The string produced by the process according to the invention thus provides optimization in both areas: the string provides the elasticity, and thus the ease of play, exhibited by thin string and, at the same time, has the wear resistance, and thus long service life, of a thick string.

In comparison with the production of a profile by extrusion, the production of a surface profile by impressing means has the advantage that use can be made of commercially available monofilament strings which are produced in large numbers and are correspondingly cost-effective.

An essential aspect of the invention is constituted by the fact that the depressions are impressed at normal temperature. This simplifies the process to a considerable extent since it is considerably easier to handle the string at normal temperature than if the string is heated for processing purposes, as in U.S. Pat. No. 4,363,613. At normal temperature, the string is extremely stable and can only be deformed under a considerable amount of pressure. There is thus no need to take specific precautions for guiding the string under constant tensile stressing, as in the case of the hot-worked string. It is possible to use a straightforward apparatus since devices for heating and cooling are dispensed with. In addition, disadvantageous effects on the material such as shrinkage or loss of elasticity are avoided.

Processing at normal temperature presumably also results in the additional hardening effects which are caused by the material being compressed in the cold state and have a positive effect on the durability of the string.

According to a preferred embodiment of the invention, the depressions are impressed by pairs of shaping rollers. These rollers rotate about spaced-apart spindles, their circumferential surfaces being pressed onto the string which is to be processed and rolling on the surface of the same. The circumferential surface is provided with the negative form of a profile which is impressed in the surface of the string by said circumferential surface being pressed onto the string. The contact pressure of the rollers on the string is produced in that the string is transported into the interspace between the circumferential surfaces of different rollers, the distance between these circumferential surfaces being smaller than the external diameter of the string.

Such an apparatus is particularly well suited for carrying out the process according to the invention. In this case, pairs of rollers can press against the string from opposite sides. This apparatus can be configured in a particularly straightforward manner if the string is transported further by an advancement means. This is because, in this case, there is no need to provide any drive for the rollers because the circumferential surfaces roll on the surface of the progressing string and the rollers are driven in this way.

According to another preferred embodiment of the invention, use is made of a string which, before processing, has an essentially round cross section. Such strings are produced in large numbers and are correspondingly cost-effective to buy.

The shape of the profile on the surface of the string can vary greatly. Particular preference is given to a profile which is essentially in the form of at least one encircling groove which runs helically around the string. The term "essentially" here is intended to mean that the groove or grooves can be interrupted, or that they only extend in certain sections. Such a pattern is produced, for example, by the apparatus according to the invention, in which certain regions of the surface of the string do not come into contact with the circumferential surfaces of the impressing rollers. Moreover, rollers whose circumferential profiles are offset with respect to one another can impress oblique grooves which do not precisely constitute the continuation of the grooves impressed by other rollers. In order not to overcomplicate matters, such profiles are likewise to be understood here as being "essentially helical".

A string with such a surface is similar to a twisted string without the string actually having to be twisted. It has the positive playing properties of a considerably more expensive string of this type. In addition, it is not beset by the problem of actually twisted strings, in which the elasticity decreases greatly over the service life. This is because, in strings of this type, some of the elasticity is produced by wound (loose) structure, but this compacts, and thus loses elasticity, when subjected to stressing.

The surface structure with helical grooves is also particularly advantageous when the string is put to use. This is because, as the string is threaded through narrow bores or when the string is drawn over an edge, it is important for the string not to block at an edge or at crossover points with transverse strings, but rather to slide easily over the same. Whereas a string with, for example, punctiform elevations would act, as it were, in the manner of a saw when drawn over an edge, a string with grooves in the form of a single-start or multi-start helix slides easily over the edge. If an edge catches in one of the depressions, it slides along in said depression without putting up pronounced resistance to the task of fitting in the string.

The depth of the profile, that is to say the distance between the surface of the string and the deepest depression or recess between two webs or elevations, is preferably 2–20% of the external diameter of the string. Even just a small profile depth is sufficient in order to increase the spin of the ball when the latter is played. According to one development of the invention, the profile depth can be set by the distance of the rollers with respect to one another being changed.

The apparatus according to the invention comprises shaping rollers which rotate about spaced-apart spindles and have a circumferential edge or surface which has the negative form of the profile which is to be impressed in the surface of the string, the distance between the circumferential surfaces or edges of the shaping rollers being slightly smaller than the external diameter of the string which is to be processed.

No device is provided for heating the strings or the rollers. As a result, the apparatus is very straightforward in configuration, that is to say there is no need to provide, for example, a closed housing and there is no need for any connections to supply lines, etc. All that is necessary is to provide a passage for the string which is to be processed.

Such an arrangement can be used to achieve permanent deformation of the surface of a monofilament string. When the string which is clamped in between the rollers is transported in its longitudinal direction, the rollers rotate and the protrusions on the circumferential surface of the rollers press into the string. This provides a profile along the string. By virtue of the appropriate shape and number of rollers, it is intended to bring the largest possible region of the surface of the string into engagement with the circumferential surface. The rollers are preferably arranged in pairs opposite one another.

One preferred configuration provides for use to be made of four shaping rollers which are arranged so as to be offset by approximately 90° with respect to one another in each case, a passage remaining for the string which is to be processed, and this passage being slightly smaller than the diameter of the string which is to be processed. In this case, the rollers are arranged so as to exert pressure on the same portion of the string at the same time and thus to produce a profile on the surface of the string by plastic deformation, the shape and size of their circumferential surfaces being coordinated with one another such that the largest possible region of the string is in engagement with the rollers. Thus—in contrast to using just two rollers—it is possible to achieve the situation where considerable pressure is applied and the cross section of the string nevertheless remains approximately round.

A drive system can be provided on one or more of the rollers to drive the roller such that the string is transported by the rollers. According to a preferred embodiment of the invention, however, it is provided that the rollers are not driven. In particular because the rolling operation is carried out at normal temperature, it is possible for the string to be transported, for example, by a winding-up device, because, in this case, it has the necessary strength for this. Dispensing with drive means results in the roller design being simplified to a considerable extent. The experience has shown that the rollers are moved to a sufficient extent just by virtue of the string being transported. This results, in particular, in it being possible for the string to be drawn quickly through the rollers, because it is not necessary to provide any further synchronization with the winding-up device. This means that large numbers can be produced in a short time.

The cross section of the depressions impressed can be selected as desired by virtue of the profile of the circumferential surfaces being configured correspondingly. The cross section may be triangular, frustoconical or semicircular. Dimensions and cross section are selected in dependence on the material of the string, on the racket which is to be strung and on the ball which is to be played.

According to a particularly preferred embodiment of the apparatus according to the invention, the circumferential surfaces of the rollers are provided with obliquely arranged impressing webs, this resulting in the string being provided with an essentially helical profile which is similar to the surface structure of a twisted string.

BRIEF DESCRIPTION OF THE DRAWINGS

Exemplary embodiments of the invention are explained in detail hereinbelow with reference to the drawings, in which.

DETAILED DESCRIPTION

Figure 1:
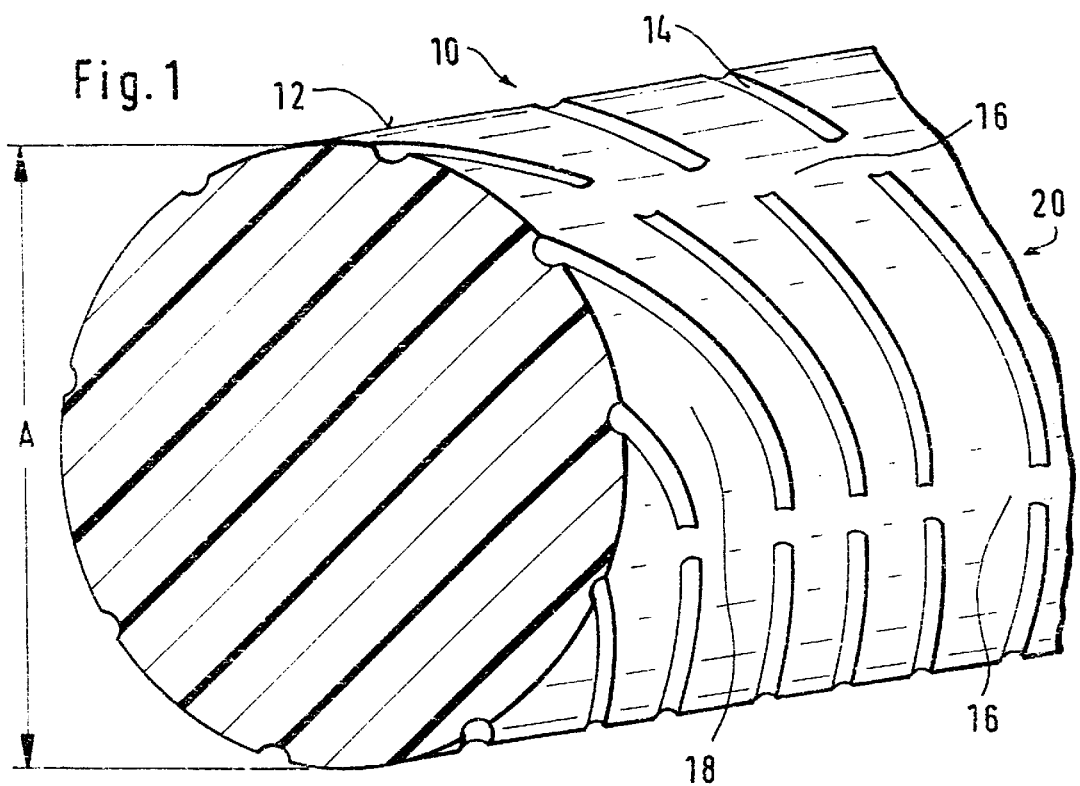
FIG. 1 shows a schematic perspective illustration of a string made of plastic monofilament.

FIG. 1 shows a schematic, enlarged illustration of the string 10 which is made of plastic monofilament and is intended for stringing rackets.

The plastic is polyethylene terephthalate (PET), but it is also possible to use any other plastic which fulfils the requirements, in terms of the tear strength, elasticity, weather resistance and processability, to which strings for rackets are subject.

The string 10 has an external diameter A of 1.4 mm. However, it is also possible for the diameter of the strings to be selected to be thinner or thicker; string diameters of between 1.0 mm and 1.8 mm are customary.

The surface 12 of the string 10 is provided with a profile 20. The profile 20 comprises depressions 14. The depressions are designed as grooves 14 impressed in the surface 12 of the string 10. Webs 18 are formed between the grooves 14.

The grooves 14 shown in FIG. 1 have a depth corresponding to approximately 2% of the external diameter A of the string 10. In other embodiments according to the invention, the depth of the grooves 14 will be considerably larger. Grooves of up to 20% of the external diameter A have been formed.

The grooves 14 run essentially helically around the surface 12 of the string 10. However, the grooves are interrupted by regions 16. The free regions 16 run on the surface 12 of the string 10 in the direction of the longitudinal axis of the latter.

The string 10 can be used in a known manner for stringing rackets. By means of the surface profile 20 it is particularly well suited for giving the ball which is to be played an increased amount of spin. Its service life, which is determined in particular by the wear resistance, is dependent on the external diameter A. Since wear usually occurs on a relatively large region of the surface 12, the wear resistance of the string 10 corresponds to that of a non-profiled string of the same diameter. This is because wear acts, in particular, on the raised regions, the webs 18.

As far as the elasticity is concerned, however, there is a considerable difference between the string 10 and a comparable string without a surface profile. The grooves 14 decrease the effective cross section of the string 10, and the string has considerably higher elasticity than a comparable string which is not profiled. This effect is even greater, when the depth of the grooves is larger than displayed in FIG. 1.

Figure 2:
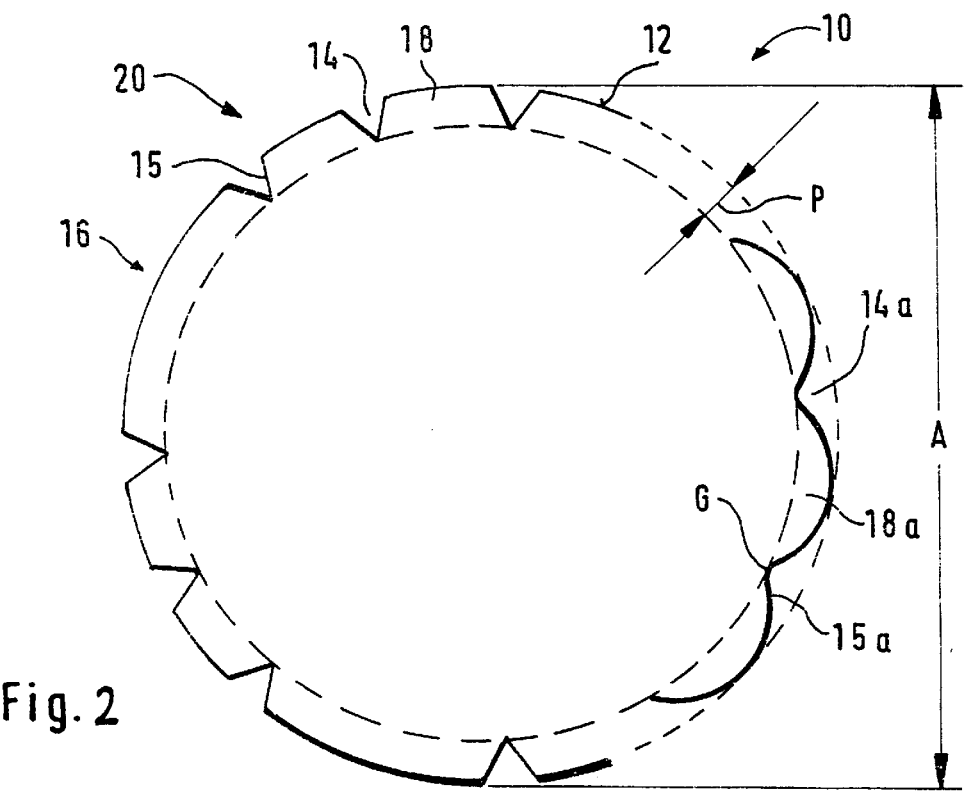
FIG. 2 shows the schematic illustration of the cross section of the string made of plastic monofilament.

FIG. 2 illustrates the string 10 in cross section. The grooves 14 are of V-shaped design. Their lowest point is located on the base line G. In this case, the profile depth P, that is to say the distance of the base line G from the surface 12 of the string 10, is approximately 5.5% of the external diameter A. The profile depth P is generally selected to be between approximately 2% and 20% of the external diameter A, depending on the desired playing and elasticity properties. Even just a small profile depth gives an increased amount of spin to the ball which is to be played.

Up to a certain optimal value, which is dependent on several parameters (material, ball to be played etc.), the capability to impart spin to a ball increases with larger profile depth P. The optimal value for a given configuration can easily be found by experimentation.

The shape of the grooves 14 impressed in the surface 12, and the shape of the resulting webs 18, may likewise differ, depending on the shape of the tool which is used to impress the groove 14. FIG. 2 illustrates on the right-hand side, by way of example, a region in which grooves 14a which have rounded side surfaces 15a are impressed in the surface. Correspondingly, the webs 18a have a rounded cross section. A multiplicity of groove and web shapes are conceivable in practice. While sharp edges help to carry along the ball when it is hit, it should be taken into account that the plastic deformation during the operation of impressing the depressions generally results in more or less round side surfaces 15a.

It is likewise possible for the density of the grooves 14 on the surface 12, and thus the width of the webs 18, to vary greatly. In the present exemplary embodiment, approximately 10 grooves 14 are arranged over a length of 1 cm along the longitudinal axis of the string 10.

Figure 3:
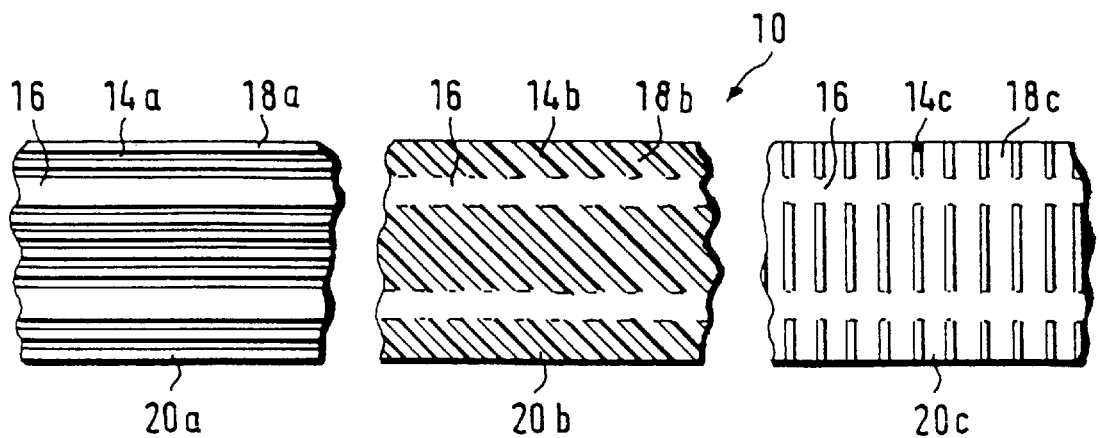
FIG. 3 shows a schematic illustration of the plan view of the string made of plastic monofilament.

FIG. 3 is a schematic illustration of portions of the string 10 each with different surface profiles 20a, 20b, 20c. The surface profile 20a has grooves 14a which run in the direction of the longitudinal axis of the string 10. Here too, webs 18a are formed between the grooves 14a, said webs likewise running in the longitudinal direction. No surface profile is impressed in regions 16.

Depicted in the center of FIG. 3 is a portion of the string 10 which has a surface profile 20b comprising grooves 14b which are arranged obliquely with respect to the longitudinal axis of the string 10. The right-hand region of the string 10 has a surface profile 20c which comprises grooves 14c which run around the string 10 in the form of a ring. These examples should demonstrate clearly that a multiplicity of possible profiles 20 can be formed by different arrangements of the grooves 14 on the surface 12 of the string 10.

Figure 4:
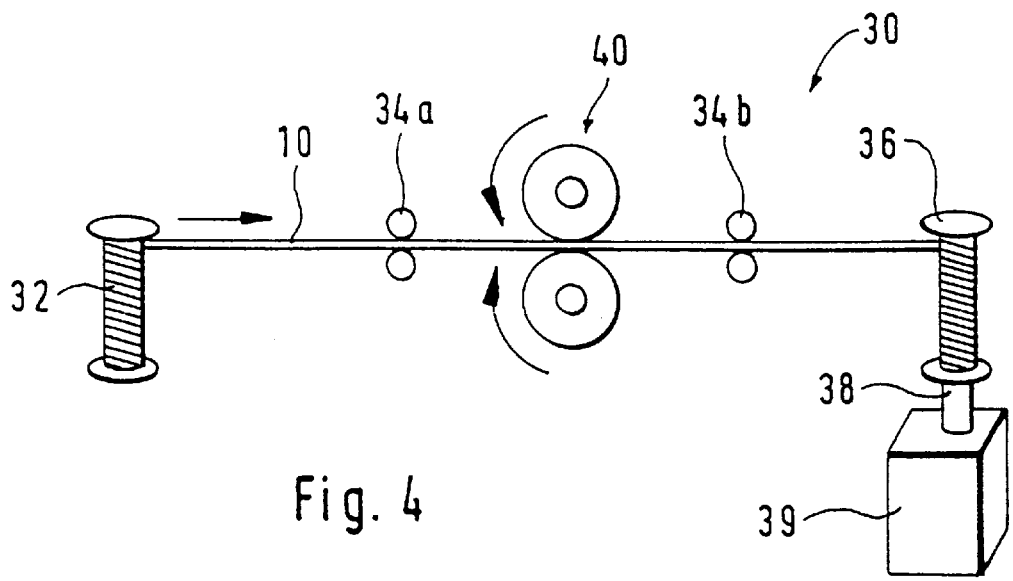
FIG. 4 shows a schematic illustration of an installation for processing the surface of a string.
Figure 5:
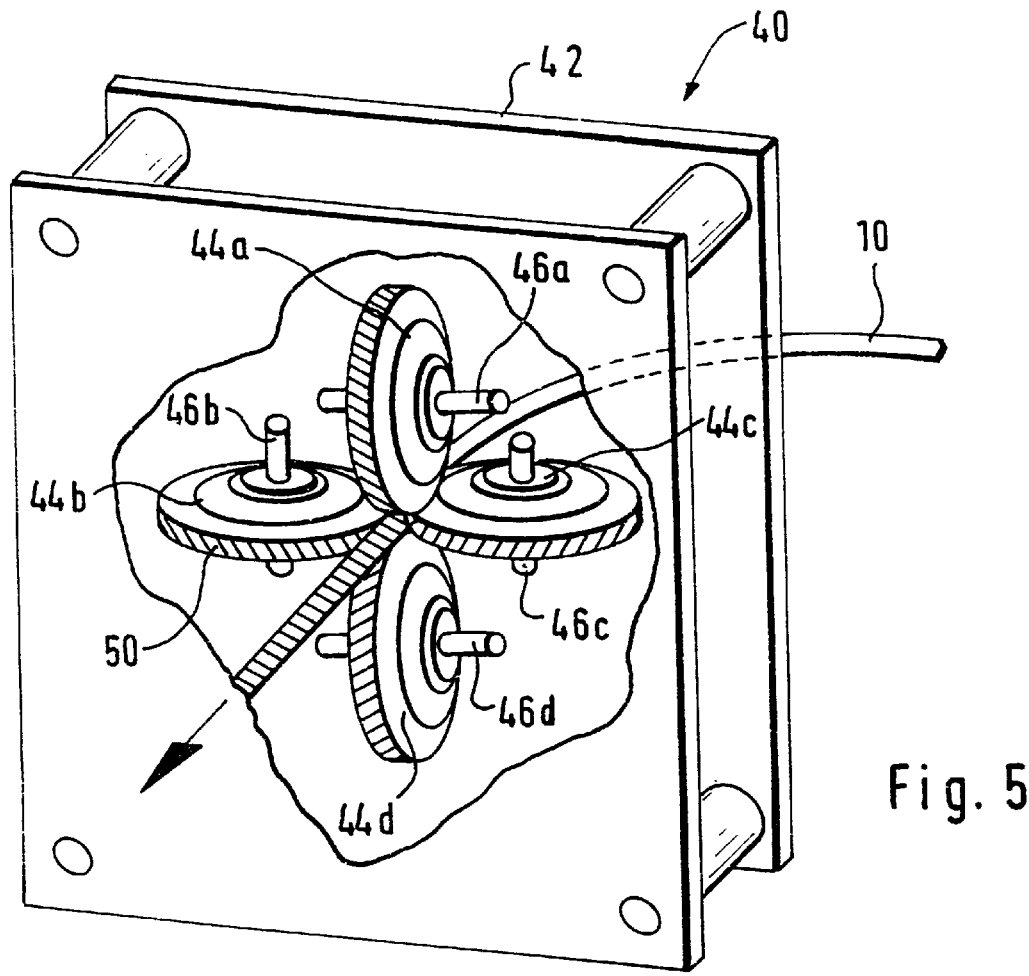
FIG. 5 shows a perspective view of an impressing device for processing a string.
Figure 6:
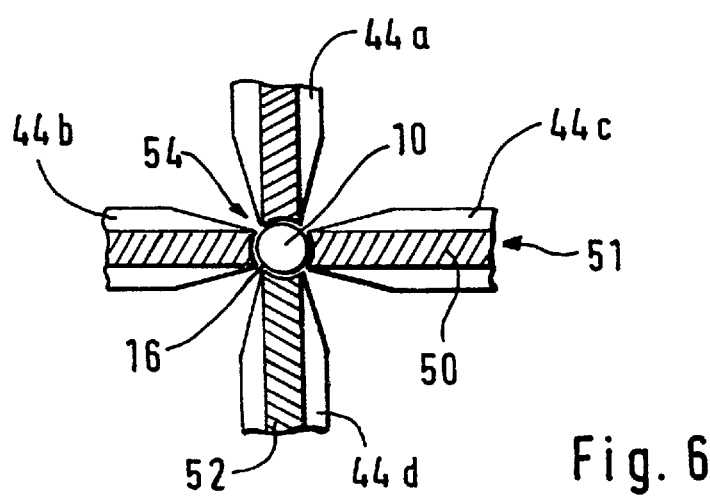
FIG. 6 shows a schematic illustration of impressing rollers on a string.

The installation which is illustrated in FIGS. 4, 5 and 6 and is intended for producing a profiled string 10 will now be described hereinbelow.

FIG. 4 is a schematic illustration of an installation 30 for processing a string 10. In the beginning of the procedure, the string 10 is located on a supply reel 32. In the apparatus 30, the string 10 is guided between (symbolically illustrated) guide means 34a until it reaches an impressing device 40, in which the surface profile 20 is impressed in the surface 12 of the string 10. Downstream of the impressing device 40, the processed string 10 is guided to the receiving reel 36 by way of guide means 34b. The receiving reel 36 is arranged on the shaft 38 which is driven by the (symbolically illustrated) drive device 39.

The processed string 10 is wound up on the receiving reel 36 by the shaft 38 being rotated. In the exemplary embodiment shown, the string 10 is transported exclusively by being wound up on the receiving reel 36, i.e. it is drawn through the guide devices 34a, 34b and through the impressing device 40 by the reel 36. It is likewise possible to provide, for example, the guide device 34b as driven rollers which draw the string 10 through the impressing device 40.

The string 10 wound up on the supply reel 32 is a commercially available string made of plastic monofilament. The impressing device 40 impresses depressions 14 in the string 10. The string 10 wound up on the receiving reel 36 has the surface profile 20 illustrated in FIG. 1.

The impressing device 40 is illustrated in more detail in FIG. 5. Four rollers 44a, 44b, 44c, 44d are arranged in a housing 42. Each of the rollers 44a, 44b, 44c, 44d has an associated spindle 46a, 46b, 46c, 46d. The spindles 46a, 46b, 46c, 46d are mounted rotatably in the housing, in bearings (not illustrated) on both sides of the rollers 44a, 44b, 44c, 44d. The position of the bearings (e.g. ball bearings, not illustrated) can be set, for example, via a screw or a spindle device (not illustrated either). There are various ways known to a person skilled in the art how to mount the spindles in a way such that the distance of two adjacent rollers can be varied.

The spindles 46a, 46b, 46c, 46d of the rollers 44a, 44b, 44c, 44d are located in one plane. The rollers 44a, 44b, 44c, 44d each have a circumferential surface 50 with an impressing profile 51 which has the negative form of the profile which is to be provided on the string 10. The shape of the rollers 44a, 44b, 44c, 44d narrows toward the outside. The circumferential surfaces 50 are curved in a slightly concave manner. The rollers 44a, 44b, 44c, 44d are each arranged in pairs above and beneath, and to the right and left of, the centrally routed string 10. The action of setting the position of the spindles 46a, 46b, 46c, 46d means that the distance between respectively opposite pairs 46a, 46d; 46b, 46c is set such that this distance is slightly smaller than the external diameter A of the string 10.

FIG. 6 shows, in a schematic illustration, how the four rollers 44a, 44b, 44c, 44d each butt against the centrally routed string 10 by way of the circumferential surface 50. The rollers 44a, 44b, 44c, 44d are pressed against the string 10 from all sides such that the impressing profile 51 of the circumferential surfaces 50 is impressed, as surface profile 20, in the surface 12 of the string 10. The impressing profile 51 comprises protruding, obliquely arranged impressing webs 52.

As has already been mentioned, the distance between opposite circumferential surfaces 50 is set such that this distance is slightly smaller than the external diameter A of the string 10. As, then, the string 10 is compressed between the circumferential surfaces 50, it is deformed elastically first of all. At the locations at which the impressing webs 52 penetrate deeper still into the plastic material of the string 10, plastic deformation then takes place: the grooves 14 are impressed as permanent deformations. The precise distance which is to be set for a profile depth P to be achieved depends on the material properties of the string 10, and the person skilled in the art can easily determine this distance by way of straightforward tests.

The width of the circumferential surfaces 50 is to be selected such that the circumferential surfaces 50 of different rollers 44a, 44b, 44c, 44d do not come into contact with one another. A gap 54 normally remains as a result. These gaps 54 are responsible for forming free regions 16 (see FIG. 1) in the surface profile 20.

The impressing device 40 can be designed particularly straightforwardly if there is no drive for the rollers 44a, 44b, 44c, 44d. The friction between the string 10 and the circumferential surfaces 50 of the rollers 44a, 44b, 44c, 44d causes these rollers 44a, 44b, 44c, 44d to be rotated along with said string 10 as the latter is subjected to tensile stressing. Moreover, the matter of whether all the rollers 44a, 44b, 44c, 44d always run synchronously is irrelevant here. This is because the precise shape of the profile 20 in the surface 12 is not critical for the playing properties of the string 10. Thus, the matter of whether, as is illustrated in FIG. 1, the grooves 14 impressed by the circumferential surfaces 50 of different rollers 44a, 44b, 44c, 44d are aligned on the surface 12, or are offset with respect to one another on the surface 12, is of no importance.

What is claimed is:

1. A process for producing a string for a racket, in which the surface (12) of an unheated string (10) made of plastic is processed so as to form a surface profile (20) on the string (10), wherein the string (10) is permanently deformed under pressure to form the surface profile (20) by depressions (14) being impressed in the surface (12) of the unheated string (10) by providing pairs of undriven shaping rollers (44a, 44b, 44c, 44d) which rotate about spaced-apart spindles (46a, 46b, 46c, 46d), the shaping rollers (44a, 44b, 44c, 44d) each comprising a circumferential surface (50) which has the negative form of the surface profile (20) which is to be impressed in the surface (12) of the string (10), the shaping rollers (44a, 44b, 44c, 44d) are arranged opposite each other with an interspace therebetween such that the distance between the circumferential surfaces (50) of the shaping rollers (44a, 44b, 44c, 44d) is slightly smaller than the external diameter (A) of the string (10) which is to be processed, and the string (10) is transported into the interspace between the shaping rollers (44a, 44b, 44c, 44d), so that the circumferential surfaces (50) of the shaping rollers (44a, 44d, 44c, 44d) press against the string (10), whereby the string (10) is transported by an advancement means (36, 38, 39) located downstream of the shaping rollers (44a, 44b, 44c, 44d) with the result that the circumferential surfaces (50) roll on the surface of the progressing string (10) to thereby drive the shaping rollers (44a, 44b, 44c, 44d).

2. The process as claimed in claim 1, wherein use is made of four shaping rollers (44a, 44b, 44c, 44d) which are arranged so as to be offset by approximately 90° with respect to one another in each case.

3. The process as claimed in claim 1, wherein, before processing, the string (10) has a circular cross section.

4. The process as claimed in claim 1, wherein the string (10) consists of plastic monofilament.

5. The process as claimed in claim 1, wherein the profile (20) is essentially in the form of one more grooves (14) which run helically around the string (10).

6. The process as claimed in claim 1, wherein the depressions (14) have a depth of from 2% to 20% of the external diameter (A) of the string (10).

7. The process as claimed in claim 1, wherein the distance between the circumferential surfaces (50) of the opposite shaping rollers (44a, 44b, 44c, 44d) is set in accordance with a desired surface profile depth (P) and the external diameter (A) of the string (10).

8. The process as claimed in claim 1, where said spindles (46a, 46b, 46c, 46d) are arranged perpendicular to the longitudinal direction of the string (10).

* * * * *

UNITED STATES PATENT AND TRADEMARK OFFICE
CERTIFICATE OF CORRECTION

PATENT NO.   : 6,117,383
DATED        : September 12, 2000
INVENTOR(S)  : Horst Kirschbaum It is certified that error appears in the above-identified patent and that said Letters Patent is hereby corrected as shown below:

Title page,
After Filing Date, please insert "Foreign Application Priority Data: July 25, 1997, Fed. Rep. Germany, 19732377.4"

Signed and Sealed this

Ninth Day of October, 2001

*Attest:*

*Attesting Officer*

NICHOLAS P. GODICI
*Acting Director of the United States Patent and Trademark Office*